United States Patent
Takayanagi

(10) Patent No.: US 9,812,070 B2
(45) Date of Patent: Nov. 7, 2017

(54) DISPLAY APPARATUS AND IRRADIATION LIGHT CONTROLLING METHOD

(71) Applicant: CANON KABUSHIKI KAISHA, Tokyo (JP)

(72) Inventor: Daisuke Takayanagi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/223,232

(22) Filed: Jul. 29, 2016

(65) Prior Publication Data
US 2017/0061898 A1    Mar. 2, 2017

(30) Foreign Application Priority Data
Aug. 25, 2015   (JP) .................. 2015-165569

(51) Int. Cl.
| H05B 33/08 | (2006.01) |
| G09G 3/34 | (2006.01) |
| H05B 37/02 | (2006.01) |
| G02F 1/1335 | (2006.01) |

(52) U.S. Cl.
CPC ..... *G09G 3/3406* (2013.01); *G02F 1/133602* (2013.01); *H05B 37/0218* (2013.01); *H05B 37/0227* (2013.01); *G02F 2001/133612* (2013.01); *G09G 2320/0626* (2013.01); *G09G 2360/144* (2013.01)

(58) Field of Classification Search
CPC combination set(s) only.
See application file for complete search history.

(56) References Cited

FOREIGN PATENT DOCUMENTS

| JP | 2008-009090 A | 1/2008 |
| JP | 2013-164561 A | 8/2013 |

*Primary Examiner* — Douglas W Owens
*Assistant Examiner* — Jianzi Chen
(74) *Attorney, Agent, or Firm* — Cowan, Liebowitz & Latman, P.C.

(57) ABSTRACT

A display apparatus has: a display unit; a light emitting unit for outputting irradiation light; a light detecting unit; an external light intensity specifying unit; and a correcting unit. When the external light intensity is equal to or smaller than an external light determination threshold value and the intensity of light detected by the light detecting unit under irradiating the irradiation light is equal to or smaller than a detected light determination threshold value larger than the external light determination threshold value, an irradiation light intensity is corrected by using a first correcting method. When the external light intensity is larger than the external light determination threshold value or the intensity of light detected by the light detecting unit under irradiating the irradiation light is larger than the detected light determination threshold value, the irradiation light intensity is not corrected or corrected by using a second correcting method.

11 Claims, 14 Drawing Sheets

| | CURRENT QUANTITY (0 TO 1000) | LIGHTING PERIOD BEFORE ADJUSTMENT (0 TO 1000) | RESULT OF MEASURING UNEVENNESS | INITIAL LIGHTING PERIOD (0 TO 1000) |
|---|---|---|---|---|
| LIGHT SOURCE UNIT U0 | 500 | 500 | 95% | 526 |
| LIGHT SOURCE UNIT U1 | 500 | 500 | 100% | 500 |
| LIGHT SOURCE UNIT U2 | 500 | 500 | 103% | 485 |
| LIGHT SOURCE UNIT U3 | 500 | 500 | 102% | 490 |
| LIGHT SOURCE UNIT U4 | 500 | 500 | 105% | 476 |
| LIGHT SOURCE UNIT U5 | 500 | 500 | 98% | 510 |

| | TARGET PHOTO SENSOR VALUE (0 TO 1000) |
|---|---|
| LIGHT SOURCE UNIT U0 | 500 |
| LIGHT SOURCE UNIT U1 | 496 |
| LIGHT SOURCE UNIT U2 | 502 |
| LIGHT SOURCE UNIT U3 | 505 |
| LIGHT SOURCE UNIT U4 | 499 |
| LIGHT SOURCE UNIT U5 | 498 |

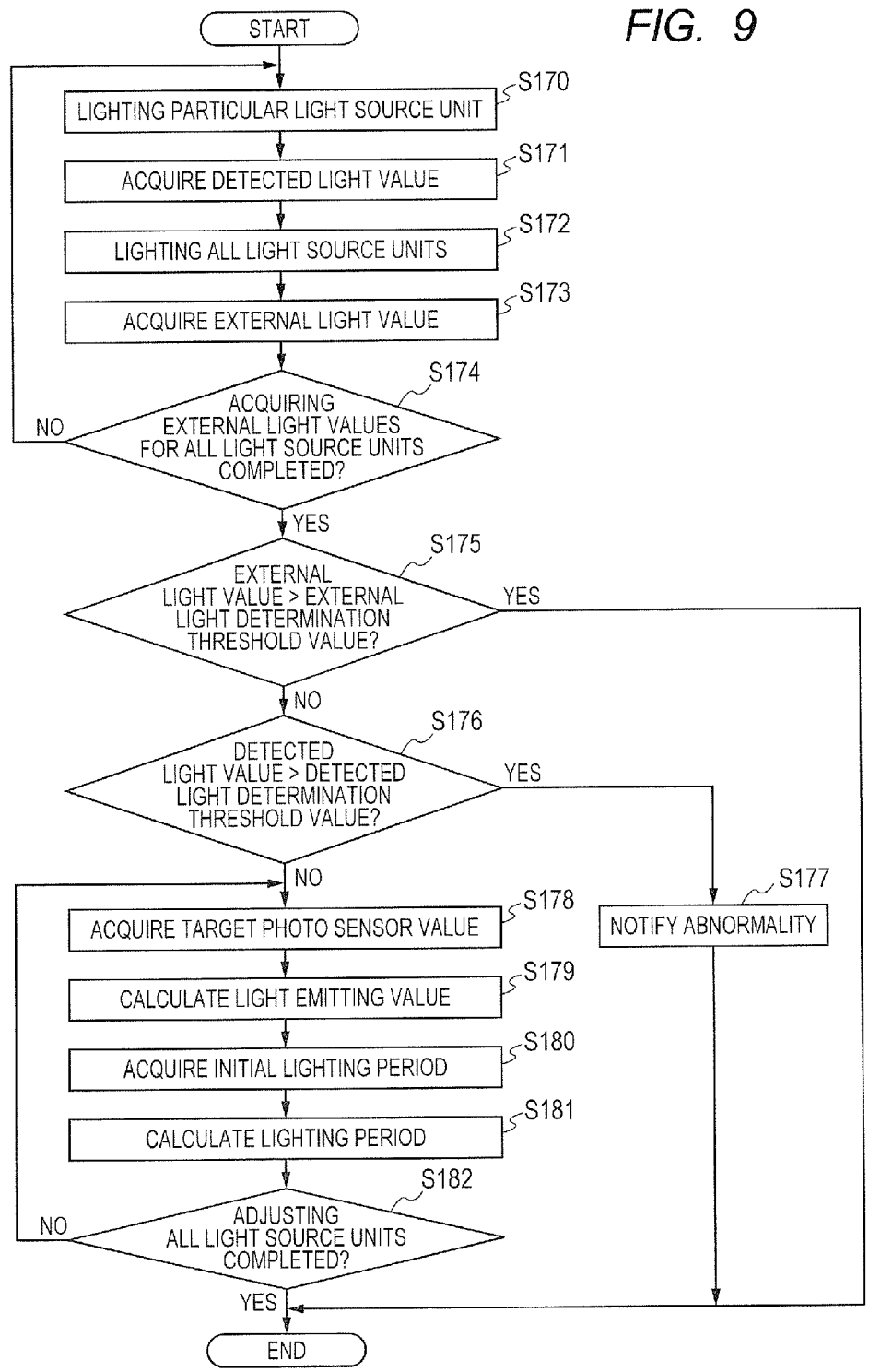

FIG. 10

|  | DETECTED LIGHT VALUE (0 TO 1000) | EXTERNAL LIGHT VALUE (0 TO 1000) |
|---|---|---|
| LIGHT SOURCE UNIT U0 | 450 | 50 |
| LIGHT SOURCE UNIT U1 | 453 | 51 |
| LIGHT SOURCE UNIT U2 | 448 | 53 |
| LIGHT SOURCE UNIT U3 | 447 | 48 |
| LIGHT SOURCE UNIT U4 | 459 | 51 |
| LIGHT SOURCE UNIT U5 | 451 | 47 |

FIG. 11

| EXTERNAL LIGHT DETERMINATION THRESHOLD VALUE | 250 |
|---|---|
| DETECTED LIGHT DETERMINATION THRESHOLD VALUE | 950 |

FIG. 12A
WEAK EXTERNAL LIGHT INTENSITY STATE

FIG. 12B
STRONG EXTERNAL LIGHT INTENSITY STATE

FIG. 12C
STRONG EXTERNAL LIGHT INTENSITY STATE OR LED FAILURE STATE

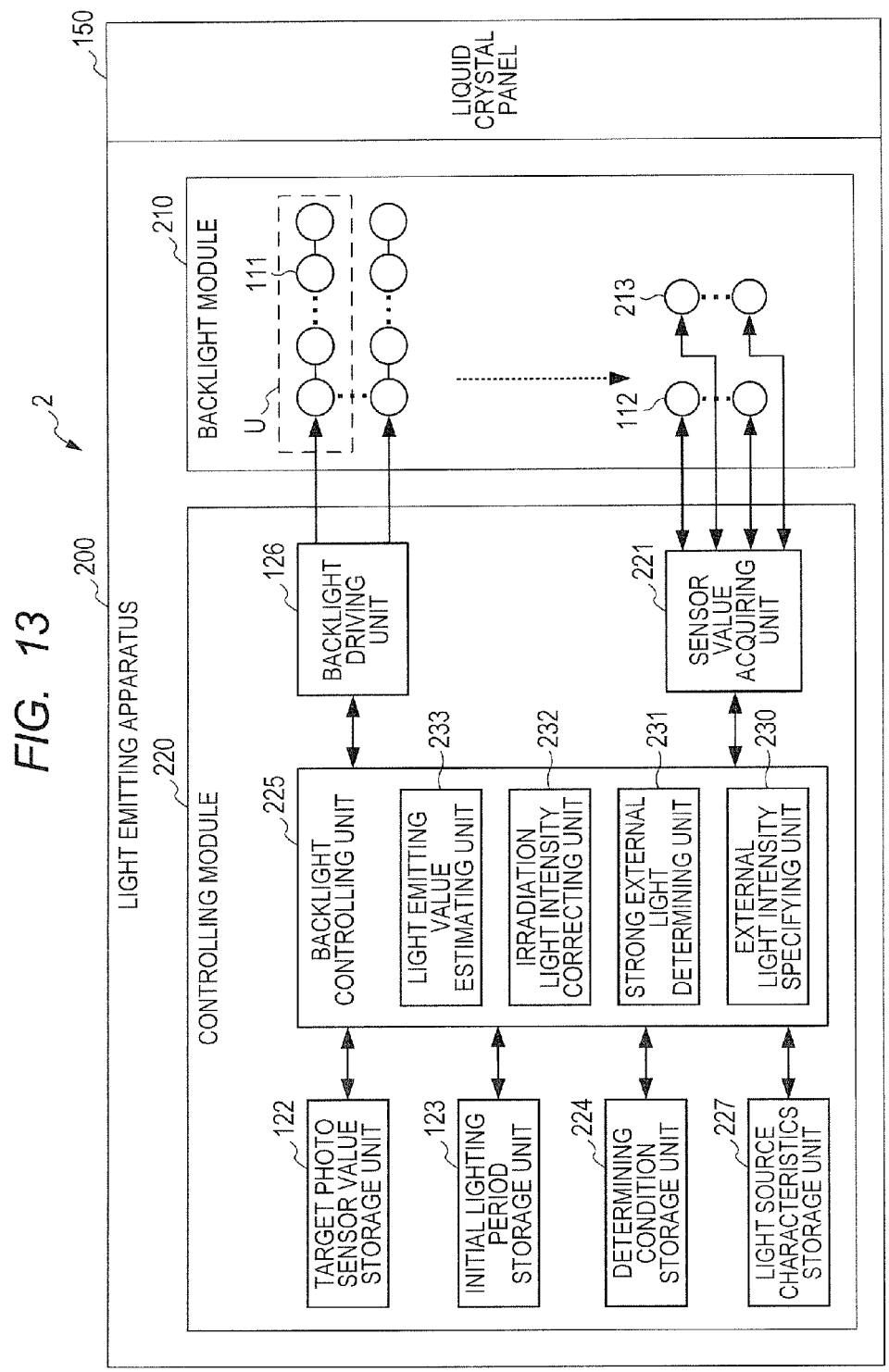

FIG. 14

| | ADJUSTMENT FACTOR AT DETECTION BY PHOTO SENSOR A | ADJUSTMENT FACTOR AT DETECTION BY PHOTO SENSOR B | ADJUSTMENT FACTOR AT DETECTION BY PHOTO SENSOR C | ADJUSTMENT FACTOR AT DETECTION BY PHOTO SENSOR D | ADJUSTMENT FACTOR AT DETECTION BY PHOTO SENSOR E | ADJUSTMENT FACTOR AT DETECTION BY PHOTO SENSOR F |
|---|---|---|---|---|---|---|
| LIGHT SOURCE UNIT U0 | 1.0 | 2.0 | 4.0 | 2.0 | 3.0 | 5.0 |
| LIGHT SOURCE UNIT U1 | 2.0 | 1.0 | 2.0 | 3.0 | 2.0 | 3.0 |
| LIGHT SOURCE UNIT U2 | 4.0 | 2.0 | 1.0 | 5.0 | 3.0 | 2.0 |
| LIGHT SOURCE UNIT U3 | 2.0 | 3.0 | 5.0 | 1.0 | 2.0 | 4.0 |
| LIGHT SOURCE UNIT U4 | 3.0 | 2.0 | 3.0 | 2.0 | 1.0 | 2.0 |
| LIGHT SOURCE UNIT U5 | 5.0 | 3.0 | 2.0 | 4.0 | 2.0 | 1.0 |

FIG. 15

| TEMPERATURE | DEGRADING RATIO |
|---|---|
| -100.0°C | -20.0% |
| -95.0°C | -19.2% |
| ... | ... |
| 25.0°C | 0.0% |
| ... | ... |
| 55.0°C | 23.0% |
| 60.0°C | 25.0% |
| 65.0°C | 27.0% |
| ... | ... |
| 95.0°C | 40.0% |
| 100.0°C | 42.0% |

FIG. 17

|  | DETECTED LIGHT VALUE (0 TO 1000) | EXTERNAL LIGHT VALUE (0 TO 1000) |
| --- | --- | --- |
| LIGHT SOURCE UNIT U0 | 1000 | 800 |
| LIGHT SOURCE UNIT U1 | 1000 | 750 |
| LIGHT SOURCE UNIT U2 | 1000 | 590 |
| LIGHT SOURCE UNIT U3 | 994 | 600 |
| LIGHT SOURCE UNIT U4 | 997 | 601 |
| LIGHT SOURCE UNIT U5 | 995 | 607 |

FIG. 18

| EXTERNAL LIGHT DETERMINATION THRESHOLD VALUE | 250 |
| --- | --- |
| DETECTED LIGHT DETERMINATION THRESHOLD VALUE | 600 |

FIG. 19

|  | DETECTED LIGHT VALUE AT DECREASING SENSITIVITY OF PHOTO SENSOR (0 TO 1000) | EXTERNAL LIGHT VALUE AT DECREASING SENSITIVITY OF PHOTO SENSOR (0 TO 1000) |
| --- | --- | --- |
| LIGHT SOURCE UNIT U0 | 1000 | 990 |
| LIGHT SOURCE UNIT U1 | 1000 | 930 |
| LIGHT SOURCE UNIT U2 | 701 | 495 |
| LIGHT SOURCE UNIT U3 | 1000 | 1000 |
| LIGHT SOURCE UNIT U4 | 1000 | 920 |
| LIGHT SOURCE UNIT U5 | 698 | 504 |

FIG. 20

|  | PHOTO SENSORS (A TO F) FOR NORMAL DETECTION | PHOTO SENSORS (A TO F) FOR STRONG EXTERNAL LIGHT DETECTION |
|---|---|---|
| LIGHT SOURCE UNIT U0 | A | C |
| LIGHT SOURCE UNIT U1 | B | C |
| LIGHT SOURCE UNIT U2 | C | C |
| LIGHT SOURCE UNIT U3 | D | F |
| LIGHT SOURCE UNIT U4 | E | F |
| LIGHT SOURCE UNIT U5 | F | F |

FIG. 21

|  | DETECTED LIGHT VALUE AT REDUCING SENSITIVITY OF PHOTO SENSOR (0 TO 1000) | EXTERNAL LIGHT VALUE AT REDUCING SENSITIVITY OF PHOTO SENSOR (0 TO 1000) |
|---|---|---|
| LIGHT SOURCE UNIT U0 | 545 | 495 |
| LIGHT SOURCE UNIT U1 | 596 | 495 |
| LIGHT SOURCE UNIT U2 | 701 | 495 |
| LIGHT SOURCE UNIT U3 | 554 | 504 |
| LIGHT SOURCE UNIT U4 | 605 | 504 |
| LIGHT SOURCE UNIT U5 | 698 | 504 |

FIG. 22

|  | TEMPERATURE (-100.0°C TO 100.0°C) |
|---|---|
| LIGHT SOURCE UNIT U0 | 60.0°C |
| LIGHT SOURCE UNIT U1 | 59.0°C |
| LIGHT SOURCE UNIT U2 | 60.2°C |
| LIGHT SOURCE UNIT U3 | 58.2°C |
| LIGHT SOURCE UNIT U4 | 58.5°C |
| LIGHT SOURCE UNIT U5 | 58.3°C |

DISPLAY APPARATUS AND IRRADIATION LIGHT CONTROLLING METHOD

BACKGROUND OF THE INVENTION

Field of the Invention

The present invention relates to a display apparatus which can control an intensity of irradiation light which is irradiated onto a display panel and to a controlling method of the irradiation light.

Description of the Related Art

In recent years, a liquid crystal display apparatus having a backlight using a light emitting diode (hereinbelow, referred to as "LED"), as a light source, which is excellent in a light emitting efficiency and a service life has been widespread. In the LED, since an individual difference, an aging degradation, a thermal degrading, and the like are large, in order to control a light emitting amount to a uniform constant value, such feedback control that the light emitting amount of the LED is detected by using a photo sensor provided near the LED and the light emitting amount of the LED is corrected based on a difference between a detected value and a target value has been devised.

However, in the case where the liquid crystal display apparatus in which such feedback control is made is used outdoors, since the photo sensor receives environmental light (hereinbelow, referred to as "external light") which passed through a liquid crystal panel, an intensity of irradiation light which is irradiated onto the liquid crystal panel from a light source cannot be detected at a high precision. Therefore, the intensity of the irradiation light which is emitted from the LED cannot be properly corrected. The Japanese Patent Application Laid-Open No. 2008-9090 discloses a method whereby a light emitting amount of a light source and an intensity of external light are respectively detected and an influence of the external light is eliminated from a detected value of a light emitting amount, thereby correcting the light emitting amount. The Japanese Patent Application Laid-Open No. 2013-164561 discloses a method whereby when an intensity of external light is small to such an extent that it does not exert an influence on a detected value of a photo sensor, a light emitting amount of a light source is corrected.

SUMMARY OF THE INVENTION

However, according to the method disclosed in the Japanese Patent Application Laid-Open No. 2008-9090, when the external light which the photo sensor receives is very strong, since the detected value of the light is fixed to an upper limit value, the influence of the external light cannot be properly eliminated. There is, consequently, such a problem that the proper correction cannot be performed and a light emitting amount of backlight cannot be set to a uniform constant value.

According to the method disclosed in the Japanese Patent Application Laid-Open No. 2013-164561, in the case of detecting a luminance of backlight and the intensity of the external light by using one photo sensor, a detecting precision of the intensity of the external light is low. If the detecting precision of the intensity of the external light is low, the luminance of the backlight cannot be estimated at a high precision, so that it is difficult to raise a precision of the correction of the light emitting amount of the light source when the intensity of the external light large. Therefore, there is such a problem that in the case where the liquid crystal display apparatus is used in such an environment that the influence of the external light is large, the light emitting amount of the backlight cannot be maintained to a uniform constant value.

According to an aspect of the invention, there is provided a display apparatus comprising: a display unit configured to display an image; a light emitting unit which is provided on a rear side of the display unit and is configured to output irradiation light which is irradiated to the display unit; a light detecting unit which is provided on a rear side of the display unit and is configured to detect an intensity of the light which enters; an external light intensity specifying unit configured to specify an intensity of external light which enters the display unit on the basis of the intensity of the light detected by the light detecting unit while the light emitting unit does not irradiate the irradiation light; and a correcting unit configured to correct an intensity of the irradiation light in such a manner that in the case where the intensity of the external light is equal to or smaller than an external light determination threshold value and the intensity of the detection light detected by the light detecting unit while the light emitting unit is irradiating the irradiation light is equal to or smaller than a detected light determination threshold value larger than the external light determination threshold value, the intensity of the irradiation light is corrected by using a first correcting method, and in the case where the intensity of the external light is larger than the external light determination threshold value or the intensity of the detection light detected by the light detecting unit while the light emitting unit is irradiating the irradiation light is larger than the detected light determination threshold value, the intensity of the irradiation light is not corrected or the intensity of the irradiation light is corrected by using a second correcting method different from the first correcting method.

According to another aspect of the invention, there is provided a display apparatus comprising: a display unit configured to display an image; a light emitting unit which is provided on a rear side of the display unit and is configured to output irradiation light which is irradiated to the display unit; a light detecting unit which is provided on a rear side of the display unit and is configured to detect an intensity of the light which enters; an external light intensity specifying unit configured to specify an intensity of external light which enters the display unit on the basis of the intensity of the light detected by the light detecting unit while the light emitting unit does not irradiate the irradiation light; and a controlling unit configured to control in such a manner that in the case where the intensity of the external light is equal to or smaller than an external light determination threshold value and the intensity of the detection light detected by the light detecting unit while the light emitting unit is irradiating the irradiation light is larger than a detected light determination threshold value larger than the external light determination threshold value, a predetermined notification is performed, and in the case where (A') the intensity of the external light is larger than the external light determination threshold value or (B') the intensity of the detection light detected by the light detecting unit while the light emitting unit is irradiating the irradiation light is equal to or smaller than the detected light determination threshold value larger than the external light determination threshold value, the predetermined notification is not performed.

According to still another aspect of the invention, there is provided an irradiation light controlling method comprising: specifying an intensity of external light which enters a display unit for displaying an image on the basis of an intensity of light detected by a light detecting unit which is provided on a rear side of the display unit and detects the intensity of the light which enters while a light emitting unit does not irradiate irradiation light to the display unit; correcting an intensity of the irradiation light by using a first correcting method in the case where the intensity of the external light is equal to or smaller than an external light determination threshold value and the intensity of the detection light detected by the light detecting unit while the light emitting unit is irradiating the irradiation light to the display unit is equal to or smaller than a detected light determination threshold value larger than the external light determination threshold value; and not correcting the intensity of the irradiation light or correcting the intensity of the irradiation light by using a second correcting method different from the first correcting method in the case where the intensity of the external light is larger than the external light determination threshold value or the intensity of the detection light detected by the light detecting unit while the light emitting unit is irradiating the irradiation light is larger than the detected light determination threshold value.

Further features of the present invention will become apparent from the following description of exemplary embodiments with reference to the attached drawings.

BRIEF DESCRIPTION OF THE DRAWINGS

FIG. 9 is a flowchart illustrating an example of a method of controlling an intensity of irradiation light.

FIG. 10 is a table illustrating a detected light value and an external light value corresponding to each light source unit U.

FIG. 11 is a table illustrating an example of an external light determination threshold value and a detected light determination threshold value.

FIGS. 12A, 12B and 12C are diagrams each illustrating a relation between (the detected light value and the external Light value) and (the detected light determination threshold value and the external light determination threshold value).

FIG. 13 is a diagram illustrating a construction of a display apparatus 2 according to the second embodiment.

FIG. 14 is a table illustrating adjustment factors stored in a light source characteristics storage unit 227.

FIG. 15 is a table illustrating a relation between a temperature and a degrading ratio.

FIG. 17 is a table illustrating a detected light value and an external light value corresponding to each light source unit U.

FIG. 18 is a table illustrating an example of an external light determination threshold value and a detected light determination threshold value.

FIG. 19 is a table illustrating a detected light value and an external light value corresponding to each light source unit U.

FIG. 20 is a table illustrating a photo sensor 112 which is used in the detection of light which is output from each light source unit U.

FIG. 21 is a table illustrating a detected light value and an external light value corresponding to each light source unit U.

FIG. 22 is a table illustrating temperature values which were output from a temperature sensor 213.

DESCRIPTION OF THE EMBODIMENTS

Preferred embodiments of the present invention will now be described in detail in accordance with the accompanying drawings.

First Embodiment

[Construction of Display Apparatus 1]

Figure 1:
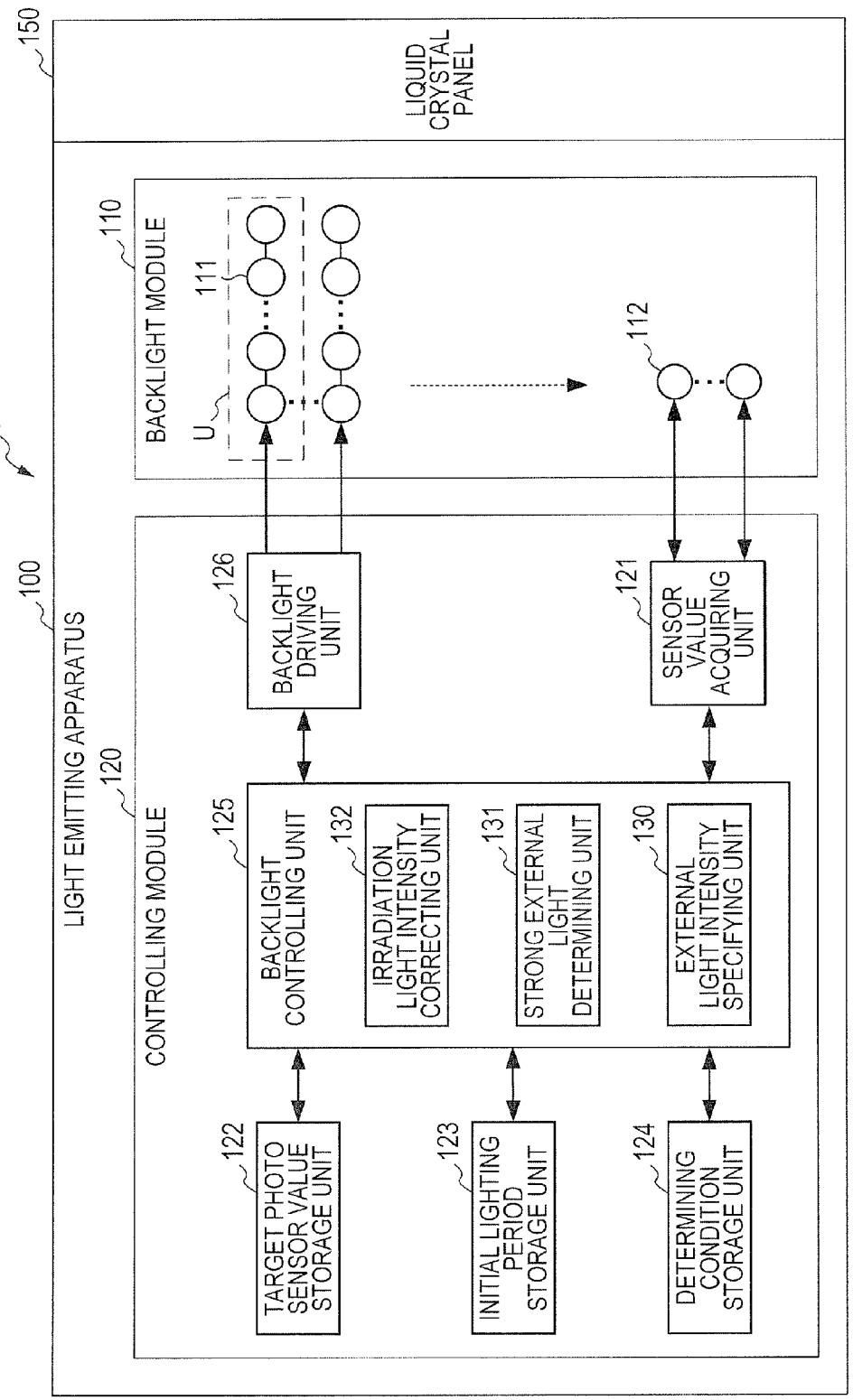
FIG. 1 is a diagram illustrating a construction of a display apparatus 1 according to the first embodiment.

FIG. 1 is a diagram illustrating a construction of a display apparatus 1 according to the first embodiment. The display apparatus 1 has a light emitting apparatus 100 and a liquid crystal panel 150. The light emitting apparatus 100 irradiates light from a rear surface or a side surface of the liquid crystal panel 150. The liquid crystal panel 150 is a display unit for displaying an image onto a screen by transmitting the light irradiated from the light emitting apparatus 100. The liquid crystal panel. 150 is not limited to the transmission liquid crystal panel but may be a reflection liquid crystal display apparatus. The liquid crystal panel 150 may be also an MEMS (Micro Electro Mechanical System) shutter type display using an MEMS shutter in place of a liquid crystal element.

The light emitting apparatus 100 according to the first embodiment stops a correction of a light emitting amount of a light source, that is, a correction of an intensity of irradiation light which is output from the light source in the case where it is determined that an influence of external light cannot be eliminated on the basis of a result obtained by comparing an intensity of the external light with an external light determination threshold value and a result obtained by comparing an intensity of detection light which is detected by a photo sensor with a detected light determination threshold value. A construction and the operation of the light emitting apparatus 100 will be described in detail hereinbelow.

The light emitting apparatus 100 has a backlight module 110 and a controlling module 120.

The backlight module 110 has a plurality of light source units U (each of which is shown by a broken line in the diagram) and a plurality of photo sensors 112. The light source unit U is a minimum unit of a light source whose light emitting amount can be controlled. One light source unit U has one or more of LEDs 111 which are serially connected. The LED 111 is a light emitting unit for outputting irradiation light which is irradiated to the liquid crystal panel 150.

The photo sensor 112 is provided on the rear side of the liquid crystal panel 150 and is a light detecting unit for detecting an intensity of light which enters. The photo sensor 112 outputs a photo sensor value serving as a detection value showing the detected light intensity. A plurality of photo sensors 112 are arranged at different positions corresponding to the plurality of light source units U. In a state where there is no external light, the photo sensor 112 can detect an intensity of the irradiation light which is output from the LED 111 of the corresponding light source unit U.

Figure 2:
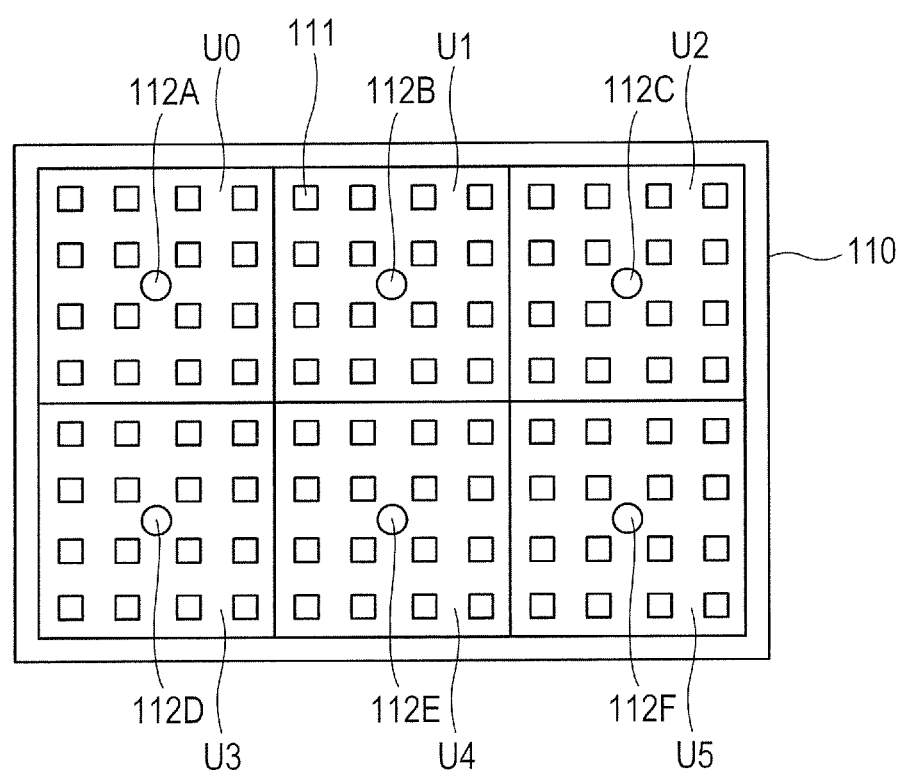
FIG. 2 is a schematic diagram illustrating an example of a layout of LEDs 111 and photo sensors 112 of a backlight module 110.

FIG. 2 is a schematic diagram illustrating an example of a layout of the LEDs 111 and the photo sensors 112 of the backlight module 110. The backlight module 110 is constructed by six light source units U0 to U5 for irradiating light to a plurality of areas of the liquid crystal panel 150. Sixteen LEDs 111 are arranged as light sources to each light source unit U. The sixteen LEDs 111 emit the light by the same current value for the same lighting period (duty ratio). Photo sensors 112A to 112F are provided for the light source units U0 to U5, respectively.

The controlling module 120 has a sensor value acquiring unit 121, a target photo sensor value storage unit 122, an initial lighting period storage unit 123, a determining condition storage unit 124, a backlight controlling unit 125, and a backlight driving unit 126. The backlight controlling unit 125 has, for example, a CPU. By executing a program stored in a storage medium (not shown), the backlight controlling unit 125 functions as an external light intensity specifying unit 130, a strong external light determining unit 131, and an irradiation light intensity correcting unit 132.

The sensor value acquiring unit 121 acquires a photo sensor value which is output from the photo sensor 112.

The target photo sensor value storage unit 122 is a memory in which a target photo sensor value of each light source unit U has been stored. The target photo sensor value is an output value of the photo sensor 112 in a state where the intensity of the light which is output from each light source unit U is uniform. For example, the target photo sensor value is written into the target photo sensor value storage unit 122 in an adjusting step at the time of production of the display apparatus 1.

The initial lighting period storage unit 123 is a memory in which a lighting period of the LED 111 in a state where the intensity of the light which is output from each light source unit. U is uniform has been stored. The LED 111 repeats a lighting state and a non-lighting state at a predetermined cycle by control of the irradiation light intensity correcting unit 132. The lighting period is a period of time of the lighting state at the predetermined cycle.

The determining condition storage unit 124 is a memory in which a threshold value serving as a condition to discriminate whether or not an influence of the external light is strong has been stored. In the embodiment, an external light determination threshold value and a detected light determination threshold value have been stored in the determining condition storage unit 124. The external light determination threshold value is a value of an intensity of the external light at the time when the detected value of the intensity of the light in the photo sensor 112 is saturated in the case where the LED 111 output the maximum irradiation light which is presumed. The detected light determination threshold value is a value of an intensity of the detected light, at the time when the detected value of the intensity of the light in the photo sensor 112 is saturated. The detected light determination threshold value is larger than the external light determination threshold value. A determining method of the external light determination threshold value and the detected light determination threshold value will be described hereinafter.

The backlight controlling unit 125 controls the intensity of the irradiation light which is output from the LED 111 by the external light intensity specifying unit 130, the strong external light determining unit 131, and the irradiation light intensity correcting unit 132 on the basis of an output value of the photo sensor 112 acquired by the sensor value acquiring unit 121.

The external light intensity specifying unit 130 specifies the intensity of the external light which enters the liquid crystal panel 150 on the basis of the intensity of the light detected by the photo sensor 112 for a period of time during which the LED 111 does not irradiate the irradiation light. The external light intensity specifying unit 130 specifies the intensity of the external light on the basis of, for example, the intensity of the light which was detected by the photo sensor 112 and was acquired by the sensor value acquiring unit 121 for a period of time during which all of the light source units U do not irradiate the irradiation light. The external light intensity specifying unit 130 specifies the intensity of the external light in each of a plurality of areas of the liquid crystal panel 150 on the basis of the intensities of the light detected by the plurality of photo sensors 112.

The strong external light determining unit 131 discriminates whether or not the external light is strong external light having an intensity larger than the external light determination threshold value by comparing the intensity of the external light specified by the external light intensity specifying unit 130 with the external light determination threshold value stored in the determining condition storage unit 124. The strong external light determining unit 131 also discriminates whether or not the external light is strong external light having an intensity larger than the external light determination threshold value by comparing the detected light value acquired by the sensor value acquiring unit 121 with the detected light determination threshold value stored in the determining condition storage unit 124.

The irradiation light intensity correcting unit 132 is a correcting unit for correcting the intensity of the irradiation light which is output from the LED 111 by adjusting a lighting period of the LED ill on the basis of a result of a discrimination in the strong external light determining unit 131. The irradiation light intensity correcting unit 132 corrects the intensity of the irradiation light which is output from each of the plurality of light source units U on the basis of a relation between the intensity of the external light in each of the plurality of areas of the liquid crystal panel 150 specified by the external light intensity specifying unit 130 and the external light determination threshold value. When the intensity of the external light is equal to or smaller than the external light determination threshold value, the irradiation light intensity correcting unit 132 corrects the intensity of the irradiation light. When the intensity of the external light is larger than the external light determination threshold value, the irradiation light intensity correcting unit 132 does not correct the intensity of the irradiation light.

When the intensity of the external light specified by the external light intensity specifying unit 130 is equal to or smaller than the external light determination threshold value, the irradiation light intensity correcting unit 132 specifies the intensity of the irradiation light by subtracting a value corresponding to the intensity of the external light from the photo sensor value. The irradiation light intensity correcting unit 132 compares, every light source unit U, the specified intensity of the irradiation light with the target photo sensor value stored in the target photo sensor value storage unit 122. The irradiation light intensity correcting unit 132 decides the lighting period of the light source unit U in accordance with a result of the comparison every light source unit U. The irradiation light intensity correcting unit 132 outputs information showing the lighting period of each light source unit U to the backlight driving unit 126.

The backlight driving unit 126 lights the LED 111 for the period of time based on the information showing the lighting period which was input from the irradiation light intensity correcting unit 132 and turns off the LED 111 for the other period of time.

Various kinds of controlling procedures in the light emitting apparatus 100 will be described in detail hereinbelow.

[Determining Method of Initial Lighting Period and Target Photo Sensor Value]

Figure 3:
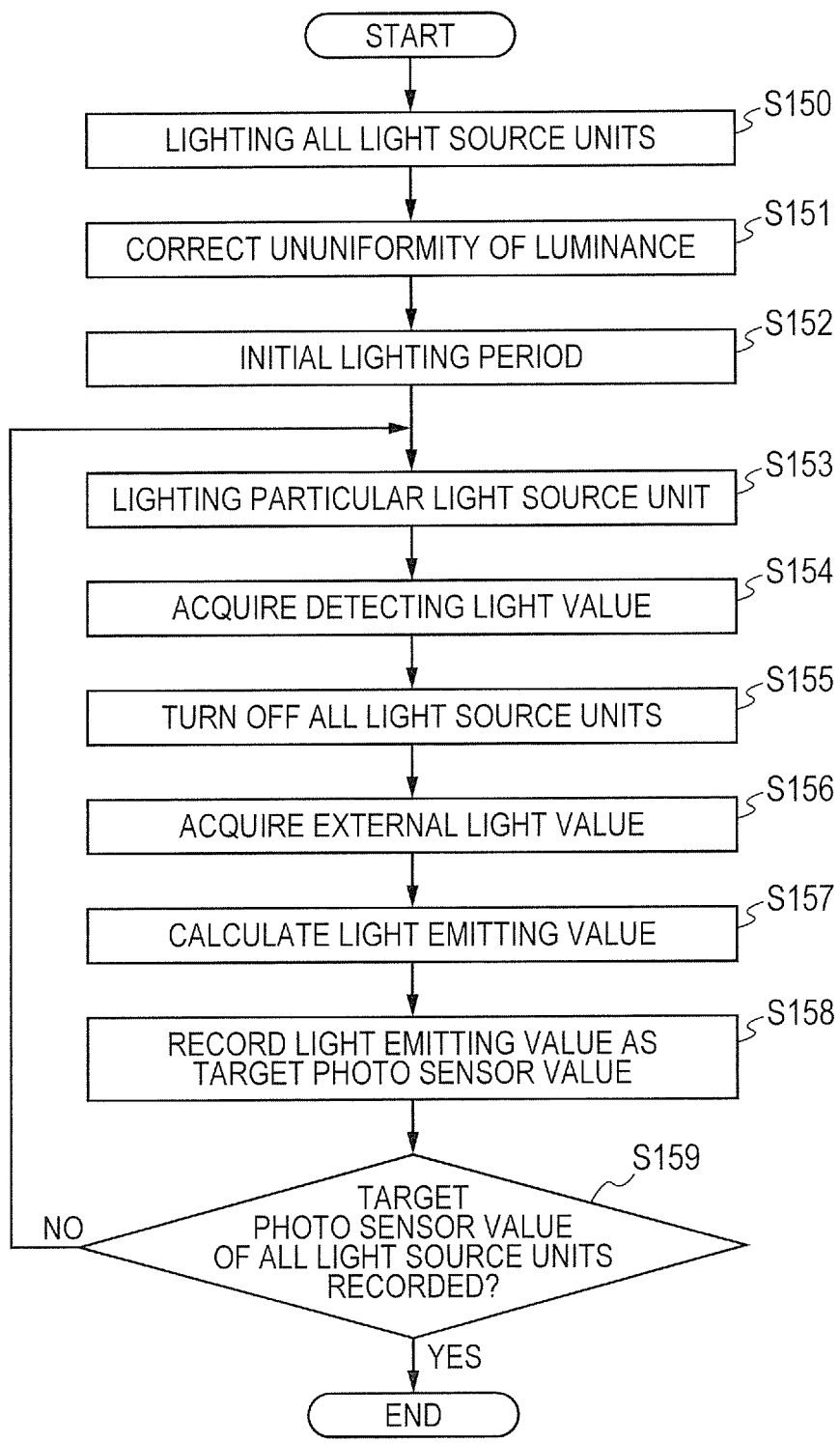
FIG. 3 is a flowchart illustrating an example of a method of determining an initial lighting period and a target photo sensor value.

FIG. 3 is a flowchart illustrating an example of a method of determining the initial lighting period and the target photo sensor value. Processes illustrated in FIG. 3 are executed in, for example, an adjusting step at the time of a production of the display apparatus 1.

First, in S150, the backlight controlling unit 125 instructs the backlight driving unit 126 to light all of the LEDs 111 by a predetermined current value for the lighting period. The backlight driving unit 126 lights all of the LEDs 111 by the predetermined current value for the lighting period in response to an instruction from the backlight controlling unit 125.

Figures 4, 5:
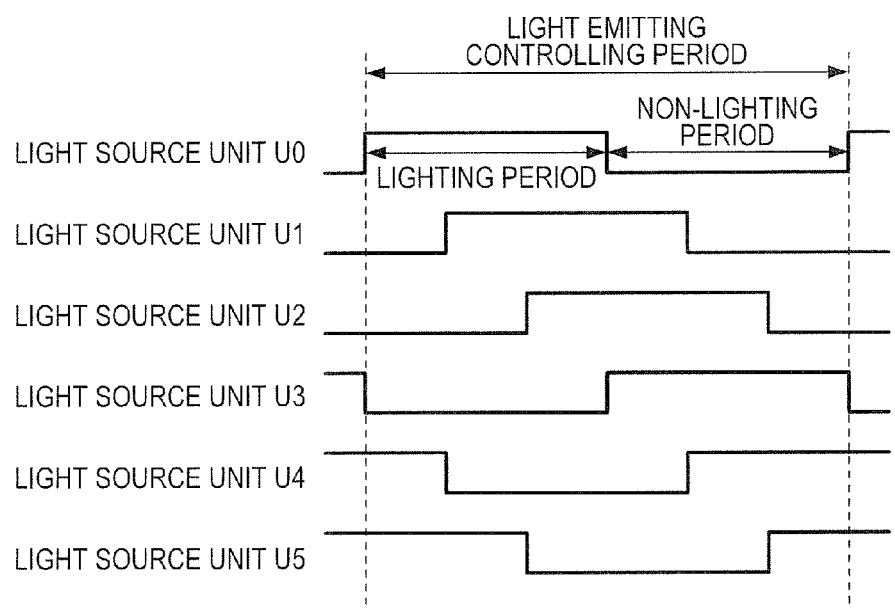
FIG. 4 is a table illustrating an example of a current value and a lighting period of each light source unit U at the time of lighting all LEDs 111.
FIG. 5 is a diagram illustrating a first lighting/non-lighting pattern of the LED 111.

FIG. 4 is a table illustrating an example of the current value and the lighting period of each light source unit U at the time of lighting all of the LEDs 111. The current value of each light source unit U is decided by a current control value expressed by an integer within a range from 0 to 1000. The value of the current which is actually supplied to the light source unit U increases linearly in association with an increase in current control value. For example, when the current control value is equal to 1000, the current which is twice as large as that in the case where the current control value is equal to 500 is supplied to the light source unit U. When the current control value is equal to 0, no current is supplied to the light source unit U, so that the light source unit U enters the non-lighting state. In the example illustrated in FIG. 4, the current value of each light source unit U is set to 500.

The lighting period of each light source unit U is determined by a lighting period control value expressed by an integer within a range from 0 to 1000. The actual lighting period increases linearly in association with an increase in lighting period control value. For example, when the lighting period control value is equal to 1000, the actual lighting period is twice as long as that in the case where the lighting period control value is equal to 500. When the lighting period control value is equal to 0, the actual lighting period is equal to 0, so that the light source unit U enters the non-lighting state. In the example illustrated in FIG. 4, the lighting period of each light source unit U is set to 500.

The range of each of the current control value and the lighting period control value is not limited to the foregoing value (0 to 1000). The actual current value may increase linearly in association with the increase in current control value. The actual current value may decrease in association with the increase in current control value. This is true of a relation between the lighting period control value and the lighting period.

Subsequently, in S151, an ununiformity of luminance in a display screen of the liquid crystal panel 150 is measured by an external measuring instrument (not shown). On the basis of a result of the measurement of the luminance ununiformity, the backlight controlling unit 125 determines the current control value and the lighting period control value adapted to correct the lighting period of each light source unit U so that a luminance of a display area becomes constant and uniform. In this instance, the luminance ununiformity is expressed by a ratio of a measurement value to an expected value of the luminance in the display screen of the liquid crystal panel 150.

As illustrated in FIG. 4, when the measurement result of the ununiformity of the light source unit U0 is equal to 95%, in order to increase a light emitting amount of the light source unit U0, the lighting period extended from the lighting period before the measurement is decided to an initial value. Specifically speaking, in the example of FIG. 4, since the lighting period before the measurement is equal to 500, the initial lighting period is adjusted to 526 (=500× 100/95). By adjusting as mentioned above, an insufficient amount (5%) of the luminance is supplemented.

In S152, the initial lighting period decided by the backlight controlling unit 125 as mentioned above is stored into the initial lighting period storage unit 123 in association with the light source unit U.

Although the case where the backlight controlling unit 125 fixes the current value to 500 and adjusts only the lighting period has been described above, both of the lighting period and the current value may be adjusted and the lighting period after the adjustment and the current value after the adjustment may be stored into the initial lighting period storage unit 123. In this case, in the initial state, the light source unit U is lit for the lighting period after the adjustment at the current value after the adjustment. The backlight controlling unit 125 may adjust only the current value and may store the current value after the adjustment into the initial lighting period storage unit 123. In this case, in the initial state, the light source unit U is lit at the current value after the adjustment for a predetermined lighting period.

Figure 6:
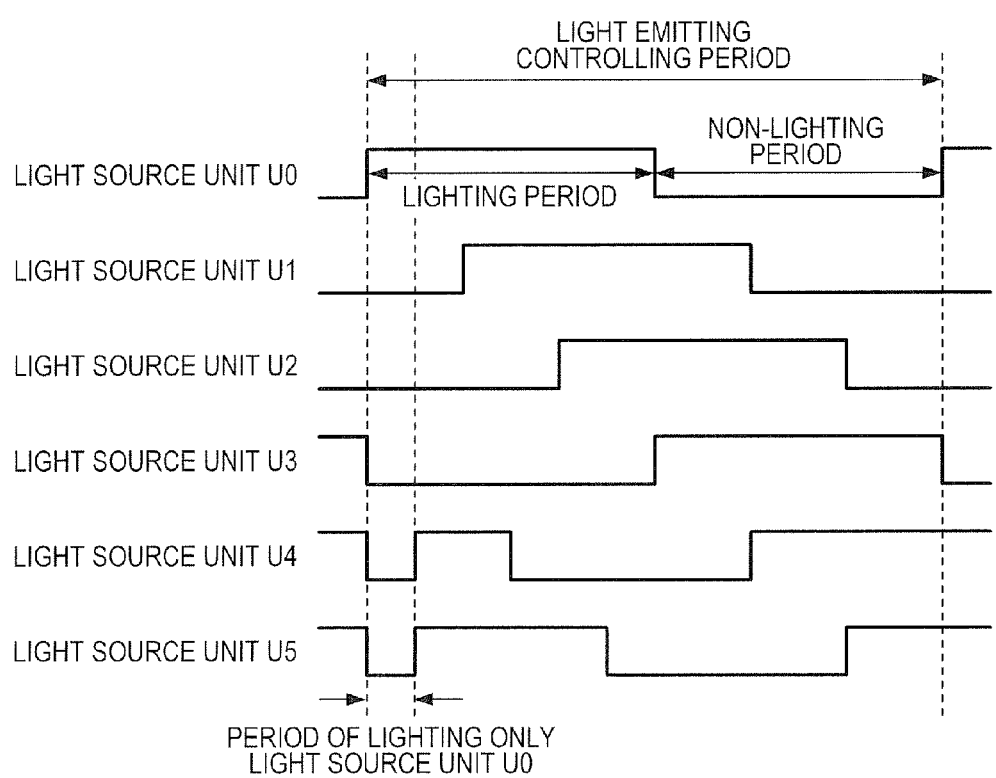
FIG. 6 is a diagram illustrating a second lighting/non-lighting pattern of the LED 111.

Subsequently, in S153, the backlight controlling unit 125 instructs the backlight driving unit 126 so as to allow only the particular light source unit U to emit the light. For example, it is assumed that each light source unit U repeats the lighting and non-lighting within a light emitting controlling period as illustrated in FIG. 5. When an instruction to make a period of time during which only the light source unit U0 is lit is received from the backlight controlling unit 125, the backlight driving unit 126 adjusts the lighting period of each light source unit U and makes the period of time during which only the light source unit U0 is temporarily lit as illustrated in FIG. 6. At this time, the backlight driving unit 126 notifies the backlight controlling unit 125 of a fact that the period of time during which only the light source unit U0 is lit has been made.

When the backlight driving unit 126 notifies the backlight controlling unit 125 of a fact that the period of time during which only the particular light source unit U is lit has been made, the processing routine advances to S154. In S154, the backlight controlling unit 125 instructs the sensor value acquiring unit 121 to acquire a photo sensor value corresponding to the intensity of the light which entered the photo sensor 112 from the photo sensor 112 provided for the particular light source unit U which has been set into the lighting state for a period of time during which the LED 111 of the particular light source unit U is outputting the irradiation light. The sensor value acquiring unit 121 acquires the photo sensor value from the photo sensor 112 provided for the particular light source unit U. The photo sensor value which is acquired in the state where the particular light source unit U has been lit is called "detected light value" in the following description.

Figures 7, 8:
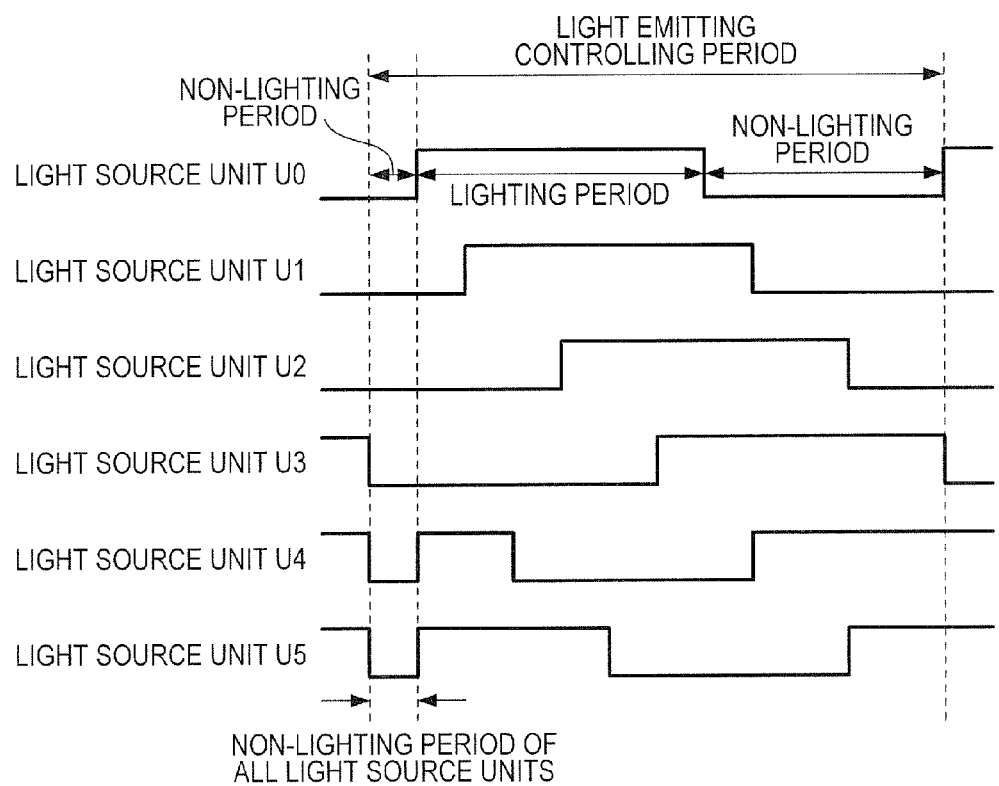
FIG. 7 is a diagram illustrating a third lighting/non-lighting pattern of the LED 111.
FIG. 8 is a table illustrating a target photo sensor value of each light source unit U.

Subsequently, in S155, the backlight controlling unit 125 instructs the backlight driving unit 126 to make the period of time during which all of the light source units U are turned off. When the instruction to make the period of time during which all of the light source units U are turned of is received from the backlight driving unit 126, as illustrated in FIG. 7, the backlight driving unit 126 adjusts the lighting period of the light source unit U and makes a period of time during which all of the light source units U are temporarily turned off. At this time, the backlight driving unit 126 notifies the backlight controlling unit 125 of a fact that the period of time during which all of the light source units U are turned off has been made.

When the backlight driving unit 126 notifies the backlight controlling unit 125 of a fact that the period of time during which all of the light source units U are turned off has been made, the processing routine advances to S156. In S156, the backlight controlling unit 125 instructs the sensor value acquiring unit 121 to acquire a photo sensor value of the particular light source unit U whose photo sensor value was acquired in S154. The sensor value acquiring unit 121 acquires the photo sensor value from the photo sensor 112 provided for the particular light source unit U. Since the photo sensor value acquired in the state where all of the light source units U were turned off corresponds to the intensity of the external light, such a photo sensor value is called "external light value" in the following description.

In foregoing S153 and S155, the backlight controlling unit 125 may instruct the sensor value acquiring unit 121 to acquire the photo sensor value a plurality of number of times and may use a representative etc.) of the acquired plurality of photo sensor values. The backlight controlling unit 125 may instruct the sensor value acquiring unit 121 to execute the process for acquiring the photo sensor value from the photo sensor 112 only once, may execute a filtering process for reducing noises to the acquired photo sensor value, and may use the photo sensor value after the filtering process.

Subsequently, in S157, the backlight controlling unit 125 calculates a light emitting value showing the intensity of the irradiation light which is output from the light source unit U on the basis of the detected light value and the external light value acquired in S154 and S156. The backlight controlling unit 125 can calculate the light emitting value by subtracting the external light value from the detected light value.

Subsequently, in S158, the backlight controlling unit 125 stores the calculated light emitting value as a target photo sensor value into the target photo sensor value storage unit 122. In S159, the backlight controlling unit 125 discriminates whether or not the target photo sensor values of all of the light source units U have been stored into the target photo sensor value storage unit 122. If the target photo sensor values of all of the light source units U have been stored into the target photo sensor value storage unit 122, the present processing flow is ended.

If the light source unit U in which the target photo sensor value is not stored exists, the backlight controlling unit 125 sets the light source unit U in which the target photo sensor value is not stored as the foregoing particular light source unit U, and the processing routine is returned to S153. The backlight controlling unit 125 repeats the procedure in S153 to S158 to all of the light source units U, thereby storing target photo sensor values of all of the light source units U into the target photo sensor value storage unit 122. FIG. 8 is a table illustrating an example of the target photo sensor values stored in the target photo sensor value storage unit 122 as mentioned above.

[Controlling Method of Irradiation Light Intensity]

Subsequently, a method whereby the backlight controlling unit 125 discriminates whether or not the light which entered the liquid crystal panel 150 strong external light and controls the intensity of the irradiation light which is output from the light source unit U on the basis of a result of the discrimination will be described with reference to FIG. 9.

FIG. 9 is a flowchart illustrating an example of a method whereby the backlight controlling unit 125 discriminates whether or not the incident light is the strong external light and a method whereby the backlight controlling unit 125 controls the intensity of the irradiation light in accordance with a result of the discrimination. The backlight controlling unit 125 executes the processing flow illustrated in FIG. 9, for example, at every predetermined time for a period of time during which the user uses the display apparatus 1. The predetermined time is a time when the light emitting amount does not remarkably change in dependence on a temperature change or the like and is equal to, for example, 10 seconds. The timing when the backlight controlling unit 125 executes the processing flow of FIG. 9 is not limited to the foregoing timing. The backlight controlling unit 125 may execute the processing flow of FIG. 9 by, for example, using the timing, as a trigger, when there is an instruction to correct the light emitting amount from the user.

First, the backlight controlling unit 125 acquires the detected light value and the external light value corresponding to each light source unit U by processes in S170 to S174. In S170, the backlight controlling unit 125 instructs the backlight driving unit 126 to make a period of time during which only the particular light source unit U is lit. In response to the instruction from the backlight controlling unit 125, the backlight driving unit 126 makes a period of time during which only the particular light source unit U emits the light, and notifies the backlight controlling unit 125 of a fact that the period of time during which only the particular light source unit U emits the light has been made.

When the fact that the period of time during which only the particular light source unit U is lit has been made is notified to the backlight controlling unit 125 from the backlight driving unit 126, the processing routine advances to S171. In S171, the backlight controlling unit 125 instructs the sensor value acquiring unit 121 to acquire a photo sensor value of the particular light source unit U. The sensor value acquiring unit 121 acquires the photo sensor value, as a detected light value, which is output from the photo sensor 112 corresponding to the particular light source unit U.

Subsequently, in S172, the backlight controlling unit 125 instructs the backlight driving unit 126 to make a period of time during which all of the light source units U are turned off. In response to the instruction from the backlight controlling unit 125, the backlight driving unit 126 makes the period of time during which all of the light source units U are turned off, and notifies the backlight controlling unit 125 of a fact that the period of time during which all of the light source units U are turned off has been made.

When the fact that the period of time during which all of the light source units U are turned off has been made is notified to the backlight controlling unit 125 from the backlight driving unit 126, the processing routine advances to S173. In S173, the backlight controlling unit 125 instructs the sensor value acquiring unit 121 to acquire a photo sensor value which is output from the photo sensor 112 corresponding to the particular light source unit U. The external light intensity specifying unit 130 specifies the photo sensor value, as an external light value, which was acquired through the sensor value acquiring unit 121 and is output from the photo sensor 112 corresponding to the particular light source unit U. By executing the processes as mentioned above, the external light intensity specifying unit 130 can specify the intensity of the external light at a high precision.

In S174, the backlight controlling unit 125 discriminates whether or not the acquiring of the detected light values and the external light values of all of the light source units U has been completed. If the backlight controlling unit 125 determined that the acquiring of the detected light values and the external light values of all of the light source units U is not completed yet, the backlight controlling unit 125 sets the light source unit U in which the acquiring is not completed as a particular light source unit U. The processing routine is returned to S170. If it is determined that the acquiring of the detected light values and the external light values of all of the light source units U has been completed, the processing routine advances to S175. FIG. 10 is a table illustrating the detected light value and the external light value corresponding to each light source unit U acquired by the foregoing procedure.

Subsequently, by processes in S175 to S177, the backlight controlling unit 125 discriminates whether or not the apparatus is in a state where an influence of the external light to the photo sensor 112 is large. By using the external light determination threshold value and the detected light determination threshold value stored in the determining condition storage unit 124, the backlight controlling unit 125 discriminates whether or not the influence of the external light is large to such an extent that, for example, when the LED 111 has output the presumed maximum irradiation light, the detected value of the intensity of the light in the photo sensor 112 is saturated.

FIG. 11 is a table illustrating an example of the external light, determination threshold value and the detected light determination threshold value. Deciding methods of the external light determination threshold value and the detected light determination threshold value will be described here.

First, the deciding methods of the external light determination threshold value will be described. The external light determination threshold value is set to such an external light value that even in a situation where the light emitting amount of the LED 111 becomes maximum due to an individual difference or a temperature change of the LED 111 and a situation where noises are contained in the photo sensor value, the photo sensor value in the photo sensor 112 is not saturated. Specifically speaking, when the light emitting amount of the LED 111 changes within a range from 300 to 700 and a maximum influence of the noises is equal to 50, the external light determination threshold value is set to 250 (=1000−700−50).

Subsequently, the deciding method of the detected light determination threshold value will be described. The detected light determination threshold value is set to such a detected light value that even in a situation where the light emitting amount of the LED 111 becomes maximum due to an individual difference or a temperature change of the LED 111 and a situation where noises are contained in the photo sensor value, the photo sensor value in the photo sensor 112 is not saturated. Specifically speaking, when the light emitting amount of the LED 111 changes within a range from 300 to 700 and a maximum influence of the noises is equal to 50, the detected light determination threshold value is set to 950 (=1000−50).

FIGS. 12A to 12C are diagrams each illustrating a relation between (the detected light value and the external light value) and (the detected light determination threshold value and the external light determination threshold value). In FIG. 12A, since the detected light value is smaller than the detected light determination threshold value and the external light value is smaller than the external light determination threshold value, this state corresponds to a state where the external light intensity is weak. In FIG. 12B, although the detected light value is smaller than the detected light determination threshold value, since the external light value is equal to or larger than the external light determination threshold value, this state corresponds to a state where the external light intensity is strong. In FIG. 12C, although the external light value is smaller than the external light determination threshold value, since the detected light value is equal to or larger than the detected light determination threshold value, this state corresponds to a state where the external light intensity is strong or the LED 111 has failed.

In S175, the backlight controlling unit 125 discriminates whether or not the apparatus is in a state where the influence of the external light is large on the basis of the external light value of each light source unit U acquired in S170 to S174 in the strong external light determining unit 131. Specifically speaking, the backlight controlling unit 125 acquires the external light determination threshold value as a determining condition from the determining condition storage unit 124 and compares with the external light value of each light source unit U. When all of the external light values are smaller than the external light determination threshold value, the backlight controlling unit 125 advances the process to S176. When at least one of the external light values is equal to or larger than the external light determination threshold value, the backlight controlling unit 125 finishes the present processing flow without controlling the intensity of the irradiation light which is output from the light source unit U.

Subsequently, in S176, the backlight controlling unit 125 discriminates whether or not the apparatus is in a state where the influence of the external light is large on the basis of the detected light value of each light source unit U acquired in S170 to S174 in the strong external light determining unit 131. Specifically speaking, the backlight controlling unit 125 acquires the detected light determination threshold value as a determining condition from the determining condition storage unit 124 and compares with the detected light value of each light source unit U. When all of the detected light values are smaller than the detected light determination threshold value, the backlight controlling unit 125 advances the process to S178.

On the other hand, when at least one of the photo sensor values is equal to or larger than the detected light determination threshold value, the backlight controlling unit 125 advances the process to S177 without executing the process for controlling the intensity of the irradiation light which is output from the light source unit U. When the detected light value is an abnormal value larger than the detected light determination threshold value, since it is impossible to distinguish whether the light emitting state has been changed because the external light is strong or the light emitting state has been changed because the LED 111 failed, in S177, the backlight controlling unit 125 outputs information showing that an abnormality occurred in the photo sensor value. The backlight controlling unit 125 may display the occurrence of the abnormality onto a display through a circuit (not shown) for controlling the drawing onto the display panel or may notify the user of the occurrence of the abnormality by changing a light emitting color or a lighting state of a power lamp.

If it is determined in S175 that the intensity of the external light is equal to or smaller than the external light determination threshold value and if it is determined in S176 that the intensity of the light detected by the photo sensor 112 for a period of time during which the light source unit U is outputting the irradiation light is equal to or smaller than the detected light determination threshold value in which the detected value of the intensity of the light in the photo sensor 112 is saturated, the backlight controlling unit 125 corrects the intensity of the irradiation light which is output from each light source unit U by executing processes in S178 to S182. When the intensity of the light detected by the photo sensor 112 is larger than the detected light determination threshold value, the backlight controlling unit 125 does not correct the intensity of the irradiation light which is output from the light source unit U.

A case of controlling the light source unit U0 will be described in detail hereinbelow. First, in S178, the backlight controlling unit 125 acquires a target photo sensor value of each light source unit U from the target photo sensor value storage unit 122. The target photo sensor value has been set as illustrated in FIG. 8 by the processes in S150 to S159. The target photo sensor value of the light source unit U0 is equal to 500.

Subsequently, in S179, the backlight controlling unit 125 calculates a light emitting value by subtracting the external light value from the detected light value in the irradiation light intensity correcting unit 132. Since the detected light value and the external light value have been set as illustrated in FIG. 10 by the processes in S170 to S174, the backlight controlling unit 125 calculates a light emitting value of the light source unit U0 to 400 (=450−50).

Subsequently, in S180, the backlight controlling unit 125 acquires an initial lighting period of each light source unit U from the initial lighting period storage unit 123. Since the initial lighting period has been set as illustrated in FIG. 4 by the processes in S150 to S159, an initial lighting period of the light source unit U0 is equal to 526.

Subsequently, in S181, the backlight controlling unit 125 calculates a lighting period after the adjustment in the irradiation light intensity correcting unit 132. The target photo sensor value of the light source unit U0 is equal to 500, the calculated light emitting value is equal to 100, and the initial lighting period is equal to 526. Therefore, the backlight controlling unit 125 calculates the lighting period to 658 (=526×500/400). The backlight controlling unit 125 outputs the calculated lighting period of the light source unit to the backlight driving unit 126. The backlight driving unit 126 allows the backlight to emit the light on the basis of the designated lighting period.

Subsequently, in S182, the backlight controlling unit 125 discriminates whether or not the adjustment of the lighting periods of all of the light source units U has been completed. If it is determined that the adjustment is not completed yet, the backlight controlling unit 125 sets the light source unit U in which the adjustment is not finished as a particular light source unit U, and the processing routine is returned to S178. If it is determined that the adjustment of the lighting periods of all of the light source units U has been completed, the backlight controlling unit 125 ends the present processing flow.

Effects in the First Embodiment

As described above, in the display apparatus 1 according to the embodiment, the external light intensity specifying unit 130 specifies the intensity of the external light which enters the liquid crystal panel 150 on the basis of the intensity of the light detected by the photo sensor 112 for a period of time during which the LED 111 does not irradiate the irradiation light. The backlight controlling unit 125 discriminates whether or not the influence of the external light is large to such an extent that the detected value of the intensity of the light in the photo sensor 112 is saturated in the case where the LED 111 output the maximum irradiation light. By executing such processes, when there is no excessive influence although there is the influence of the external light as illustrated in FIG. 12A, the display apparatus 1 can make feedback control of the intensity of the irradiation light which is output from the LED ill on the basis of the intensity of the external light specified at a high precision. When the sensor detected value is saturated by the influence of the external light, as illustrated in FIGS. 12B and 12C in FIGS. 12A to 12C, since the display apparatus 1 does not perform the erroneous correction to the light emitting amount of the backlight, the intensity of the irradiation light which is output from the LED 111 can be maintained within a proper range.

Although the example in which the light source unit U has one or more LEDs 111 has been described above, the light source unit U may have another light emitting device such as a cold-cathode tube or the like. Although the example in which the backlight controlling unit 125 controls the intensity of the irradiation light which is output from the light source unit U by changing the lighting period of the light source unit U has been described above, the backlight controlling unit 125 may change the light emitting luminance of the light source unit U by changing the value of the current which is supplied to the light source unit U. Although the example in which the backlight controlling unit 125 uses the detected light determination threshold value and the external light determination threshold value in order to discriminate whether or not the apparatus is in the state where the influence of the external light is large has been described above, the backlight controlling unit 125 may use only either the detected light determination threshold value or the external light determination threshold value.

Second Embodiment

[Construction of Display Apparatus 2]

FIG. 13 is a diagram illustrating a construction of a display apparatus 2 according to the second embodiment. In the display apparatus 2 according to the second embodiment, when the specified intensity of the external light is equal to or smaller than the external light determination threshold value, the intensity of the irradiation light is corrected by using the first correcting method used in the first embodiment. The display apparatus 2 differs from the display apparatus 1 according to the first embodiment with respect to a point that when the intensity of the external light is larger than the external light determination threshold value and when the influence of the external light which is exerted on the photo sensor value which is output from the photo sensor 112 is large, the intensity of the irradiation light is corrected by using a second correcting method different from the first correcting method. For example, in the display apparatus 2, in the second correcting method, the intensity of the irradiation light which is output from the light source unit U is estimated by a unit other than the photo sensor 112 and the intensity of the irradiation light is controlled on the basis of a result of the estimation. In FIG. 13, substantially the same functional portions as those illustrated in FIG. 1 according to the first embodiment are designated by the same reference numerals as those in FIG. 1.

The display apparatus 2 illustrated in FIG. 13 has a light emitting apparatus 200 and the liquid crystal panel 150. The light emitting apparatus 200 has a backlight module 210 and a controlling module 220. In addition to the construction of the backlight module 110 illustrated in FIG. 1, the backlight module 210 further has temperature sensors 213. The temperature sensor 213 is provided near the photo sensor 112 and can detect a temperature of each light source unit U.

The controlling module 220 has a sensor value acquiring unit 221, the target photo sensor value storage unit 122, the initial lighting period storage unit 123, a determining condition storage unit 224, a backlight controlling unit 225, the backlight driving unit 126, and a light source characteristics storage unit 227. The sensor value acquiring unit 221, the determining condition storage unit 224, and the backlight controlling unit 225 correspond to the sensor value acquiring unit 121, the determining condition storage unit 124, and the backlight controlling unit 125, respectively. The backlight controlling unit 225 has an external light intensity specifying unit 230, a strong external light determining unit 231, an irradiation light intensity correcting unit 232, and a light emitting value estimating unit 233. The external light intensity specifying unit 230, the strong external light determining unit 231, and the irradiation light intensity correcting unit 232 correspond to the external light intensity specifying unit 130, the strong external light determining unit 131, and the irradiation light intensity correcting unit 132, respectively, and a different point will be mainly described hereinbelow. The light emitting value estimating unit 233 will be described in detail hereinafter.

An adjustment factor corresponding to a sensitivity of each photo sensor 112 in the case of detecting the intensity of the irradiation light which is output from each light source unit U has been stored in the light source characteristics storage unit 227. FIG. 14 is a table illustrating the adjustment factors stored in the light source characteristics storage unit 227. As illustrated in FIG. 2, the backlight module 210 has the photo sensors 112A to 112F as photo sensors 112. The larger a distance between the light source unit U and the photo sensor 112 is, the adjustment factor has a larger value. The adjustment factor is used when the backlight controlling unit 225 controls the intensity of the irradiation light which is output from each light source unit U by using the photo sensors 112 other than the closest photo sensor 112 corresponding to the light source unit U in the second correcting method.

A table showing a relation between the temperature of the light source unit U and a degrading ratio has also been stored in the light source characteristics storage unit 227. The degrading ratio is a reduction ratio of the light emitting amount to the light emitting value of the light source unit U in the case where the temperature is equal to 25° C. FIG. 15 is a table illustrating the relation between the temperature and the degrading ratio. The table illustrated in FIG. 15 is used when the light, emitting value estimating unit 233 estimates the intensity of the irradiation light on the basis of the temperature value acquired from the temperature sensor 213.

Since deciding methods of the initial lighting period and the target photo sensor value are similar to those in the first embodiment, their description is omitted. It is assumed that the initial lighting period and the target photo sensor value in the embodiment are substantially the same as those in FIGS. 4 and 8 in the first embodiment.

[Controlling Method of Irradiation Light Intensity]

Figure 16:
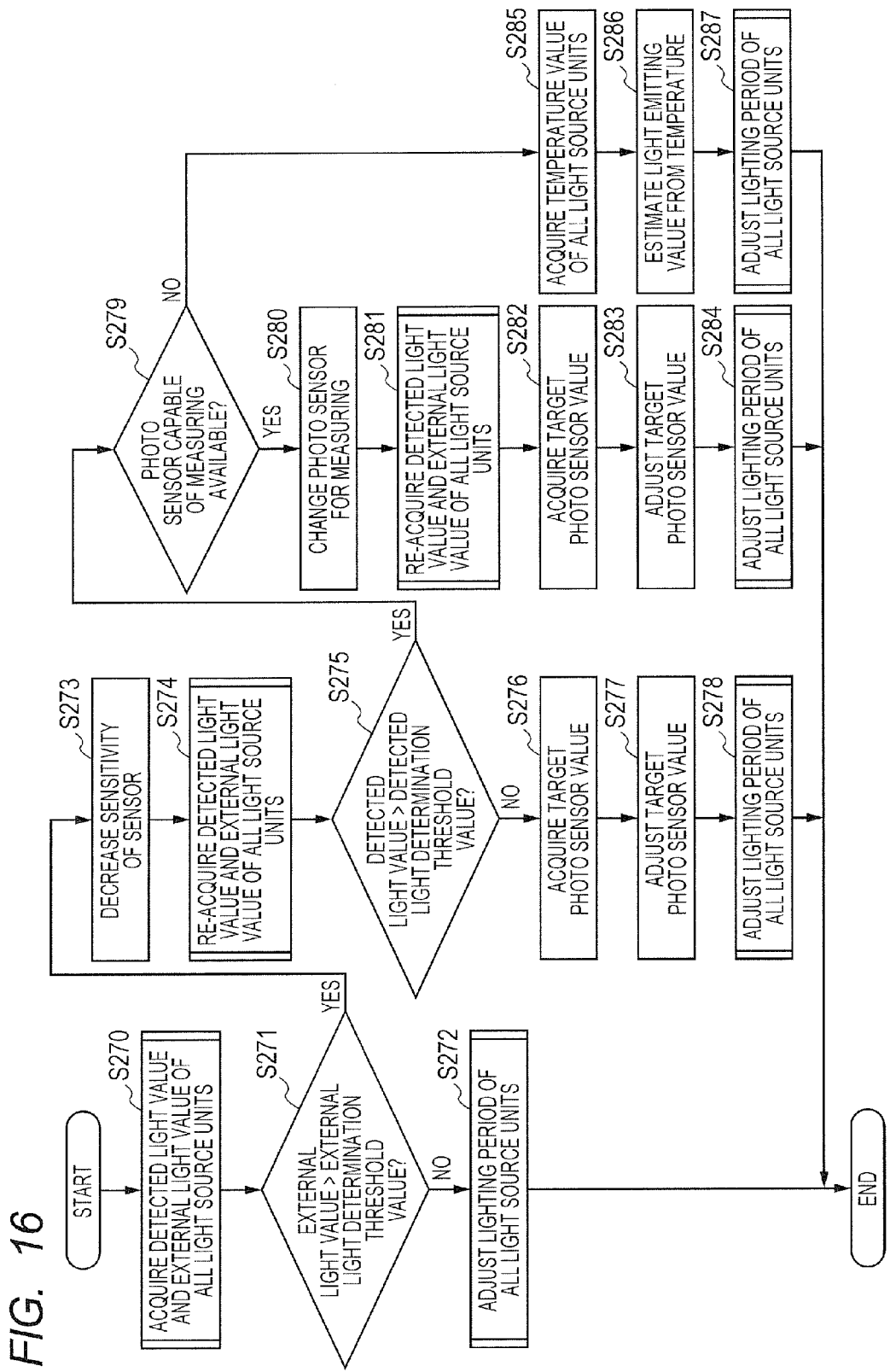
FIG. 16 is a flowchart illustrating an example of a method of correcting an intensity of irradiation light in the second embodiment.

Subsequently, a method of discriminating the strong external light in the light emitting apparatus 200 according to the embodiment and a method of correcting the intensity of the irradiation light in accordance with a result of the discrimination will be described with reference to FIG. 16. FIG. 16 is a flowchart illustrating an example of the method of discriminating the strong external light in the light emitting apparatus 200 and the method of correcting the intensity of the irradiation light by using the correcting method according to the result of the discrimination. A processing flow of FIG. 16 is executed, for example, at every predetermined time for a period of time during which the user uses the display apparatus 2. As shown in the processing flow of FIG. 16, when the intensity of the external light is equal to or smaller than the external light determination threshold value, the irradiation light intensity correcting unit 232 in the backlight controlling unit 225 according to the embodiment corrects the intensity of the irradiation light by using the first correcting method, and when the intensity of the external light is larger than the external light determination threshold value, the irradiation light intensity correcting unit 232 corrects the intensity of the irradiation light by using the second correcting method different from the first correcting method.

First, the method whereby the backlight controlling unit 225 corrects the intensity of the irradiation light which is output from each light source unit U by processes in S270 to S272 will be described.

In S270, the backlight controlling unit 225 acquires the detected light values and the external light values corresponding to all of the light source units U. Specifically speaking, the backlight controlling unit 225 executes the processes in S170 to S174 in FIG. 9. In the embodiment, it is assumed that the detected light values and the external light values acquired by the backlight controlling unit 225 are as illustrated in FIG. 17.

Subsequently, in S271, the backlight controlling unit 225 allows the strong external light determining unit 231 to discriminate whether or not the apparatus is in a state where the influence of the external light is strong on the basis of the external light value acquired in S270. First, the backlight controlling unit 225 acquires the external light determination threshold value from the determining condition storage unit 224. The external light determination threshold value to discriminate whether or not the influence of the external light is strong by comparing with the external light value as illustrated in FIG. 18 has been stored in the determining condition storage unit 224. It is assumed that such an external light determination threshold value is equal to the external light determination threshold value in the first embodiment.

Subsequently, the backlight controlling unit 225 compares the external light determination threshold value with the external light value of each light source unit U acquired in S270. When all of the external light values of the light source units U are equal to or smaller than the external light determination threshold value, the backlight controlling unit 225 advances the process to S272, executes the process for adjusting the lighting period of the light source unit U (processes similar to S178 to S182 in FIG. 9), and ends the present processing flow. When at least one of the external light values is larger than the external light determination threshold value, the backlight controlling unit 225 advances the process to S273.

(Sensitivity of Photo Sensor is Changed.)

Subsequently, a method whereby when the intensity of the external light is excessively large and the photo sensor value is saturated, the backlight controlling unit 225 decreases the sensitivity of the photo sensor by using the processes in S273 to S278 as a second correcting method and controls the intensity of the irradiation light which is output from each light source unit U will be described. The backlight controlling unit 225 controls the sensitivity of the photo sensor 112 on the basis of the relation between the intensity of the external light and the external light determination threshold value and corrects the intensity of the irradiation light on the basis of the photo sensor value of the photo sensor 112 in the controlled sensitivity.

In S213, the backlight controlling unit 225 instructs the sensor value acquiring unit 221 so as to decrease the sensitivity of the photo sensor 112 which was strongly subjected to the influence of the external light. The sensor value acquiring unit 221 executes a process for decreasing the sensitivity of the photo sensor 112. In the embodiment, it is assumed that the backlight controlling unit 225 changes the sensitivity of the photo sensor 112 to ½. Thus, for example, even in the case of the light emitting amount corresponding to 1200 in which the photo sensor value before the sensitivity is changed is saturated, the sensor value acquiring unit 221 can acquire the photo sensor value of 600 which is equal to ½ of 1200. Although the backlight controlling unit 225 may selectively change only the sensitivity of the photo sensor 112 in which the photo sensor value is saturated, it may change the sensitivities of all of the photo sensors 112.

Subsequently, in S274, the backlight controlling unit 225 re-acquires the detected light values and the external light values of all of the light source units U. Specifically speaking, the backlight controlling unit 225 executes the processes shown in S170 to S174 in FIG. 9. FIG. 19 illustrates the detected light values and the external light values which were acquired here.

Subsequently, in S275, the backlight controlling unit 225 allows the strong external light determining unit 231 to discriminate whether or not the apparatus is in a state where the influence of the external light is large on the basis of the external light value of each light source unit U acquired in S274. The detected light determination threshold value as shown in FIG. 18 for discriminating whether or not the influence of the external light is large in the case where the sensitivity of the photo sensor 112 was decreased has been stored in the determining condition storage unit 224.

A deciding method of the detected light determination threshold value in the case where the sensitivity of the photo sensor 112 was decreased will now be described. The detected light, determination threshold value is set to such a detected light value that even in a situation where the light, emitting value of the LED 111 becomes maximum due to an individual difference or a temperature change of the LED 111 and a situation where noises are contained in the photo sensor value, the photo sensor value in the photo sensor 112 in the state of the decreased sensitivity is not saturated. Specifically speaking, the light emitting value of the LED 111 changes within a range from 150 to 350 in the state of the decreased sensitivity and when the maximum influence of the noises is equal to 50, the detected light determination threshold value is set to 600 (=1000−350−50).

The backlight controlling unit 225 acquires the detected light determination threshold value from the determining condition storage unit 224 and compares with the detected light value corresponding to each light source unit U. When all of the detected light values are equal to or smaller than the detected light determination threshold value, the determining condition storage unit 224 advances the process to S276. When at least one of the detected light values is larger than the detected light determination threshold value, the determining condition storage unit 224 advances the process to S279.

Subsequently, in S276, the backlight controlling unit 225 acquires the target photo sensor value of each light source unit U from the target photo sensor value storage unit 122. A case where the backlight controlling unit 225 controls the irradiation light which is output from the light source unit U0 will be described as an example. Since the target photo sensor values of the light source units U have been set as illustrated in FIG. 8, the target photo sensor value of the light source unit U0 is equal to 500.

Subsequently, in S277, the backlight controlling unit 225 adjusts the acquired target photo sensor value on the basis of the decrease in sensitivity of the photo sensor 112. In the embodiment, since the backlight controlling unit 225 set the sensitivity of the photo sensor 112 to ½ time, the target photo sensor value of the light source unit U0 is calculated to 250 (=500/2).

Subsequently, in S278, the backlight controlling unit 225 controls the intensity of the irradiation light of each light source unit U. First, the backlight controlling unit 225 allows the irradiation light intensity correcting unit 232 to calculate a light emitting value obtained by excluding the external light value from the detected light value. At this time, the backlight controlling unit 225 calculates the light emitting value of the light source unit U0 to 200 (=600−400).

Subsequently, the backlight controlling unit 225 acquires an initial lighting period corresponding to each light source unit U from the initial lighting period storage unit 123. Since the initial lighting period has been set as shown in FIG. 4, the initial lighting period of the light source unit U0 is equal to 526.

Subsequently, the backlight controlling unit 225 allows the irradiation light intensity correcting unit 232 to calculate the lighting period after the adjustment. In the state where the sensitivity of the photo sensor of the light source unit U0 has been decreased, the target photo sensor value is equal to 250, the light emitting value is equal to 200, and the initial lighting period is equal to 526. Therefore, the backlight controlling unit 225 calculates the lighting period to 658 (526×250/200). The backlight controlling unit 225 outputs the calculated lighting period of the light source unit U0 to the backlight driving unit 126. The backlight driving unit 126 allows the light source unit U0 to emit the light on the basis of the designated lighting period.

(Photo Sensor which is Used is Changed)

Subsequently, in S275, a method whereby when the detected light value is larger than the detected light determination threshold value, the backlight controlling unit 225 changes the photo sensor 112 for detecting the irradiation light by using the processes in S279 to S284 as a second correcting method and controls the intensity of the irradiation light which is output from each light source unit U will be described. When the external light value is larger than the external light determination threshold value or when the detected light value is larger than the detected light determination threshold value, the backlight controlling unit 225 can change the photo sensor 112 which is used to specify the intensity of the external light.

First, in S279, the backlight controlling unit 225 discriminates whether or not the photo sensor 112 capable of measuring the intensity of the irradiation light exists on the basis of the detected light value and the external light value detected in S274. Specifically speaking, the backlight controlling unit 225 discriminates the presence or absence of the light source unit U in which the detected light value and the external light value are not saturated. For example, if the detected light value and the external light value acquired in S274 are as shown in FIG. 19, the backlight controlling unit 225 determines that the detected light value and the external light value are not saturated in the two light source units U2 and U5 and the influence of the external light in the photo sensor 112 of each of those two light source units U is small. On the other hand, when the detected light values or the external light values of all of the light source units U are saturated, the determining condition storage unit 224 advances the process to S285.

Subsequently, in S280, the backlight controlling unit 225 instructs the sensor value acquiring unit 221 so as to change the photo sensor 112 which is used to detect the irradiation light with respect to the light source unit U in which the detected light value or the external light value is saturated. The sensor value acquiring unit 221 changes the photo sensor 112 to detect the irradiation light of each light source unit U. FIG. 20 is a table illustrating the photo sensors 112 before and after the change in the embodiment.

Subsequently, in S281, the backlight controlling unit 225 re-acquires the detected light values and the external light values of all of the light source units U. FIG. 21 is a table illustrating the detected light values and the external light values acquired here.

Subsequently, in S282, the backlight controlling unit 225 acquires the target photo sensor value of each light source unit U from the target photo sensor value storage unit 122. A case where the backlight controlling unit 225 controls the light source unit U0 wall be described hereinbelow as an example. Since the target photo sensor value has been set as shown in FIG. 8, the target photo sensor value of the light source unit U0 is equal to 500.

Subsequently, in S283, to the acquired target photo sensor value, the backlight controlling unit 225 performs the adjustment due to the decrease in sensitivity of the sensor and the adjustment due to the change of the photo sensor for detection by using the adjustment factor stored in the light source characteristics storage unit 227. In the embodiment, the sensitivity of the sensor has been set to ½.

In the case where the light emitting value of the light source unit U0 is detected by the photo sensor 112C, according to the table illustrated in FIG. 14, the adjustment factor is equal to 4.0. Thus, the backlight controlling unit 225 calculates the target photo sensor value to 63 (=500/2/4.0).

Subsequently, in S284, the backlight controlling unit 225 controls the intensity of the irradiation light which is output from each light source unit U. First, the backlight controlling unit 225 allows the irradiation light intensity correcting unit 232 to calculate the light emitting value obtained by excluding the external light value from the detected light value. At this time, the light emitting value of the light source unit U0 is calculated to 50 (=545−495). Subsequently, the backlight controlling unit 225 acquires the initial lighting period of each light source unit U from the initial lighting period storage unit 123. Since the initial lighting period has been set as shown in FIG. 4, the initial lighting period of the light source unit U0 is equal to 526.

Subsequently, the backlight controlling unit 225 allows the irradiation light intensity correcting unit 232 to calculate the lighting period after the adjustment. The backlight controlling unit 225 calculates the lighting period to 663 (=526×63/50) since the sensitivity of the photo sensor 112C corresponding to the light source unit U0 has been decreased, the target photo sensor value at the time when the irradiation light has been detected by the photo sensor 112C is equal to 63, the light emitting value is equal to 50, and the initial lighting period is equal to 526. The backlight controlling unit 225 outputs the calculated lighting period of the light source unit U0 to the backlight driving unit 126. The backlight driving unit 126 allows the light source unit U0 to emit the light on the basis of the designated lighting period.

(Temperature Sensor is Used)

Subsequently, a case where when the photo sensor 112 capable of measuring the intensity of the irradiation light does not exist in S279, the backlight controlling unit 225 uses the processes in S285 to S287 as a second correcting method will be described. In the processes in S285 to S287, the backlight controlling unit 225 corrects the intensity of the irradiation light on the basis of the light emitting amount of the light source unit U estimated by the light emitting value estimating unit 233. The light emitting value estimating unit 233 estimates the light emitting amount on the basis of the temperature which is output from the temperature sensor 213 provided near the photo sensor 112.

First, in S285, the backlight controlling unit 225 allows the sensor value acquiring unit 221 to acquire a temperature value of each light source unit U. It is assumed that the temperature sensor 213 can output the temperature value within a range from −100.0° C. to 100.0° C. FIG. 22 is a table illustrating the temperature values which were output from the temperature sensor 213.

Subsequently, in S286, the backlight controlling unit 225 allows the light emitting value estimating unit 233 to estimate the intensity of the irradiation light on the basis of the temperature value acquired from the temperature sensor 213. The light emitting value estimating unit 233 can estimate the intensity of the irradiation light which is output from the light source unit U on the basis of the degrading ratio corresponding to the temperature value by referring to the table illustrated in FIG. 15.

The backlight controlling unit 225 allows the irradiation light intensity correcting unit 232 to correct the intensity of the irradiation light which is output from the light source unit U on the basis of the estimation value of the intensity of the irradiation light in the light emitting value estimating unit 233 when the intensity of the external light is larger than the external light determination threshold value. For example, when the temperature of the light source unit U0 is equal to 60.0° C., the degrading ratio is equal to 25.0%. Thus, the backlight controlling unit 225 calculates the lighting period to 658 (=526×1.25) and allows the light source unit U0 to emit the light for the calculated lighting period. After completion of the adjustment of the lighting periods of all of the light source units U, the backlight controlling unit 225 ends the present processing flow.

In the flowchart of FIG. 16, when the intensity of the external light is larger than the external light determination threshold value and when the intensity of the detected light, is larger than the detected light determination threshold value, the backlight controlling unit 225 corrects the irradiation light by using the second correcting method. However, the invention is not limited to such a method. The backlight controlling unit 225 may correct the irradiation light by using the second correcting method when the intensity of the external light is equal to or smaller than the external light determination threshold value and when the intensity of the detected light is larger than the detected light determination threshold value. In such a case, the backlight controlling unit 225 may output abnormality information showing the occurrence of an abnormality.

In the foregoing second correcting method, the changing process of the sensitivity of the photo sensor, the changing process of the photo sensor which is used, and the estimating process of the light emitting amount based on the temperature sensor may be solely executed or a part of them may be executed.

Effects in the Second Embodiment

As described above, in the display apparatus 2 according to the embodiment, the determining condition storage unit 224 discriminates whether or not the influence of the external light is large to such an extent that the detected value of the intensity of the light in the photo sensor 112 is saturated in the case where the LED 111 has output the maximum irradiation light. If it is determined that the influence of the external light, is large, the determining condition storage unit 224 corrects the intensity of the irradiation light which is output from the light source unit U by using a method different from that in the case where it is determined that the influence of the external light is small. By executing such processes, even when the influence of the external light is large, the light source unit U can emit the light at a proper intensity.

Although the method whereby when the external light is strong and the light emitting amount cannot be detected by the photo sensor 112, the light emitting value estimating unit 233 estimates the light emitting amount by using the temperature sensor and controls has been described in the embodiment, the light emitting value estimating unit 233 may estimate the light emitting amount on the basis of a result obtained by measuring an accumulated using time of the light source unit U or an accumulated light emitting time. The light emitting value estimating unit 233 may estimate the light emitting amount on the basis of a using situation (luminance setting, light emitting pattern, and the like) of the light source unit U for a period of time during which the display apparatus 2 is used and an installing environment (ambient environment temperature, an inclination at the time of installing, and the like). The light emitting value estimating unit 233 may estimate the light emitting amount by a combination of them.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include network separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-165569, filed Aug. 25, 2015, which is hereby incorporated by reference herein in its entirety.

What is claimed is:

1. A display apparatus comprising:
a display unit configured to display an image;
a light emitting unit which is provided on a rear side of the display unit and is configured to output irradiation light which is irradiated to the display unit;
a light detecting unit which is provided on a rear side of the display unit and is configured to detect an intensity of the light which enters;
an external light intensity specifying unit configured to specify an intensity of external light which enters the display unit on the basis of the intensity of the light, detected by the light detecting unit while the light emitting unit does not irradiate the irradiation light; and
a correcting unit configured to correct an intensity of the irradiation light in such a manner that in the case where the intensity of the external light is equal to or smaller than an external light determination threshold value and the intensity of the detection light detected by the light detecting unit while the light emitting unit is irradiating the irradiation light is equal to or smaller than a detected light determination threshold value larger than the external light determination threshold value, the intensity of the irradiation light is corrected by using a first correcting method, and in the case where the intensity of the external light is larger than the external light determination threshold value or the intensity of the detection light detected by the light detecting unit while the light emitting unit is irradiating the irradiation light is larger than the detected light determination threshold value, the intensity of the irradiation light is not corrected or the intensity of the irradiation light is corrected by using a second correcting method different from the first correcting method.

2. An apparatus according to claim 1, further comprising a controlling unit configured to control in such a manner that in the case where the intensity of the external light is equal to or smaller than the external light determination threshold value and the intensity of the detection light detected by the light detecting unit while the light emitting unit is irradiating the irradiation light is larger than the detected light determination threshold value, a predetermined notification is performed, and in the case where the intensity of the detected light is equal to or smaller than the detected light determination threshold value, the predetermined notification is not performed.

3. An apparatus according to claim 1, wherein in the case of correcting the intensity of the irradiation light by using the second correcting method, the correcting unit corrects the intensity of the irradiation light on the basis of the intensity of the light detected by the light detecting unit in a state where a sensitivity of the light detecting unit was changed.

4. An apparatus according to claim 1, wherein:
the light detecting unit has a plurality of photo sensors provided at different positions; and
in the case of correcting the intensity of the irradiation light by using the second correcting method, the correcting unit corrects the intensity of the irradiation light on the basis of the intensity of the light detected by the light detecting unit after the photo sensor which is used to specify the intensity of the external light was changed.

5. An apparatus according to claim 1, further comprising an estimating unit configured to estimate the intensity of the irradiation light which is output from the light emitting unit, and
wherein in the case of correcting the intensity of the irradiation light by using the second correcting method, the correcting unit corrects the intensity of the irradiation light which is output from the light emitting unit on the basis of an estimation value of the intensity of the irradiation light estimated by the estimating unit.

6. An apparatus according to claim 1, wherein:
the light emitting unit has a plurality of light sources for outputting the irradiation light to a plurality of areas of the display unit;
the light detecting unit has a plurality of photo sensors for detecting the irradiation light which is output from the plurality of light sources;
the external light intensity specifying unit specifies the intensity of the external light in each of the plurality of areas on the basis of the intensities of the light detected by the plurality of photo sensors; and
the correcting unit corrects the intensity of the irradiation light which is output from each of the plurality of light sources on the basis of a relation between the intensity of the external light in each of the plurality of areas specified by the external light intensity specifying unit and the external light determination threshold value.

7. An apparatus according to claim 6, wherein:
the light emitting unit outputs the irradiation light from the selected one of the plurality of light sources;
the light detecting unit detects the intensity of the light, which enters while the light source is outputting the irradiation light by the photo sensor corresponding to the selected light source among the plurality of photo sensors; and
in the case where the intensity of the external light is equal to or smaller than the external light determination threshold value, the correcting unit corrects the intensity of the irradiation light on the basis of a result of a comparison between the intensity of the irradiation light specified by subtracting the intensity of the external light from the intensity of the light detected by the light detecting unit and a target value.

8. A display apparatus comprising:
a display unit configured to display an image;
a light emitting unit configured to output irradiation light which is irradiated to the display unit;
a light detecting unit which is provided on a rear side of the display unit and is configured to detect an intensity of the light which enters;
an external light intensity specifying unit configured to specify an intensity of external light which enters the display unit on the basis of the intensity of the light detected by the light detecting unit while the light emitting unit does not irradiate the irradiation light; and
a controlling unit configured to control in such a manner that in the case where (A) the intensity of the external light is equal to or smaller than an external light determination threshold value and (B) the intensity of the detection light detected by the light detecting unit while the light emitting unit is irradiating the irradiation light is larger than a detected light determination threshold value larger than the external light determination threshold value, a predetermined notification is performed, and in the case where (A') the intensity of the external light is larger than the external light determination threshold value or (B') the intensity of the detection light detected by the light detecting unit while the light emitting unit is irradiating the irradiation light is equal to or smaller than the detected light determination threshold value larger than the external light determination threshold value, the predetermined notification is not performed.

9. An apparatus according to claim 8, wherein the controlling unit performs the predetermined notification by allowing the display unit to perform a predetermined display.

10. An irradiation light controlling method comprising:
specifying an intensity of external light which enters a display unit for displaying an image on the basis of an intensity of light detected by a light detecting unit which is provided on a rear side of the display unit and detects the intensity of the light which enters while a light emitting unit does not irradiate irradiation light to the display unit;
correcting an intensity of the irradiation light by using a first correcting method in the case where the intensity of the external light is equal to or smaller than an external light determination threshold value and the intensity of the detection light detected by the light detecting unit while the light emitting unit is irradiating the irradiation light to the display unit is equal to or smaller than a detected light determination threshold value larger than the external light determination threshold value; and
not correcting the intensity of the irradiation light or correcting the intensity of the irradiation light by using a second correcting method different from the first correcting method in the case where the intensity of the external light is larger than the external light determination threshold value or the intensity of the detection light detected by the light detecting unit while the light emitting unit is irradiating the irradiation light, is larger than the detected light determination threshold value.

11. An irradiation light controlling method comprising:
specifying an intensity of external light which enters a display unit for displaying an image on the basis of an intensity of light detected by a light detecting unit which is provided on a rear side of the display unit and detects the intensity of the light which enters while a light emitting unit does not irradiate irradiation light to the display unit;
controlling in such a manner that in the case where the intensity of the external light is equal to or smaller than an external light determination threshold value and the intensity of the detection light detected by the light detecting unit while the light emitting unit is irradiating the irradiation light to the display unit is larger than a detected light determination threshold value larger than the external light determination threshold value, a predetermined notification is performed, and in the other case, the predetermined notification is not performed.

\* \* \* \* \*